US011236445B2

(12) United States Patent
Maleck et al.

(10) Patent No.: US 11,236,445 B2
(45) Date of Patent: Feb. 1, 2022

(54) TEXTILE MACHINE AND METHOD FOR CONTROLLING A TEXTILE MACHINE

(71) Applicant: Maschinenfabrik Rieter AG, Winterthur (CH)

(72) Inventors: Mario Maleck, Walting (DE); Robin Wein, Manching (DE)

(73) Assignee: Maschinenfabrik Rietet AG, Winterthur (CH)

(*) Notice: Subject to any disclaimer, the term of this patent is extended or adjusted under 35 U.S.C. 154(b) by 182 days.

(21) Appl. No.: 16/556,408

(22) Filed: Aug. 30, 2019

(65) Prior Publication Data
US 2020/0071857 A1    Mar. 5, 2020

(30) Foreign Application Priority Data
Aug. 31, 2018 (DE) ............... 10 2018 121 316.6

(51) Int. Cl.
*D01H 1/14*   (2006.01)
(52) U.S. Cl.
CPC ..... *D01H 1/14* (2013.01); *G05B 2219/45191* (2013.01)
(58) Field of Classification Search
CPC ........... G05B 2219/45191; D01H 1/28; G06F 2213/0022
USPC .............. 700/130, 136, 139; 57/264
See application file for complete search history.

(56) References Cited

U.S. PATENT DOCUMENTS

| | | | | |
|---|---|---|---|---|
| 4,964,031 A | * | 10/1990 | Gotoh | G05B 19/0428 139/1 R |
| 5,246,039 A | * | 9/1993 | Fredriksson | D03D 47/3033 139/452 |
| 5,303,873 A | * | 4/1994 | Oe | B65H 54/40 242/486.3 |
| 6,937,918 B2 | * | 8/2005 | Bahlmann | D01H 4/42 700/130 |

FOREIGN PATENT DOCUMENTS

| | | |
|---|---|---|
| DE | 195 47 068 A1 | 6/1997 |
| DE | 101 42 976 A1 | 3/2003 |
| DE | 102 12 712 A1 | 10/2003 |

(Continued)

OTHER PUBLICATIONS

German Patent Office Search Report, dated Jul. 1, 2019.
EP Search Report, dated Jan. 29, 2020.

*Primary Examiner* — Khoa D Huynh
*Assistant Examiner* — Grace Huang
(74) *Attorney, Agent, or Firm* — Dority & Manning, P.A.

(57) ABSTRACT

A textile machine and related method of operation include a plurality of adjacently arranged workstations divided into a plurality of sections, each workstation having a plurality of communication-capable units, and each section comprising at least two section busses and a section control system. The communication-capable units of the workstations in the section are in communication with the section control system via one of the section busses. A first portion of the communication-capable units of the workstations in each section are configured in communication with a first one of the section busses and a second portion of the communication-capable units of the workstations in the same section are configured in communication with a second one of the section busses.

12 Claims, 4 Drawing Sheets

(56) References Cited

FOREIGN PATENT DOCUMENTS

| | | | |
|---|---|---|---|
| DE | 10 2007 043 418 A1 | 3/2009 | |
| DE | 101 53 457 B4 | 7/2015 | |
| EP | 1953648 A1 * | 8/2008 | ............ D01H 13/00 |
| EP | 2 028 298 B1 | 9/2012 | |
| WO | WO-2008083796 A1 * | 7/2008 | ............ B65H 54/70 |

\* cited by examiner

TEXTILE MACHINE AND METHOD FOR CONTROLLING A TEXTILE MACHINE

FIELD OF THE INVENTION

The present invention relates to a textile machine, in particular a spinning machine or winder, comprising a plurality of adjacently arranged workstations, which are combined to form multiple sections and include multiple communication-capable units. The sections each comprise a section control system and the communication-capable units of the workstations of a section are connected to a section bus for communication with the section control system. Moreover, the invention relates to a method for controlling such a textile machine, in particular a spinning machine or winder, comprising a plurality of adjacently arranged workstations, which are combined to form multiple sections.

BACKGROUND

Textile machines and methods for controlling textile machines have become known in different embodiments from the related art. For example, DE 101 53 457 B4 describes such a textile machine, in the case of which the sections each comprise a section control system. Each of the individual workstations comprises at least one actuator and at least one sensor, each of which is directly connected to the section bus, to which the section control system is also connected. The section control systems, in turn, are connected to a common machine bus, which is connected to a machine control system. This concept reaches its limits in the case of modern textile machines comprising several workstations, however, since the maximum number of bus users is limited. For example, frequently only 64 users or up to 128 users per bus are possible, but the workstations of modern machines each comprise multiple communication-capable functional units. Therefore, given 20 workstations per section, the maximum number of bus users is quickly reached. Moreover, a large number of bus users and correspondingly long bus lines can result in a congestion of information on the bus line, and therefore important control signals or sensor signals can no longer be transmitted or can be transmitted only with great delay. This can result in considerable problems, in particular, during shutdown, during restart, or during piecing at the workstations.

EP 2 028 298 B1 therefore provides another concept for reducing the number of bus users, in particular, on a section bus. In this case, the workstations of a section are combined to form groups and a common group control system is associated with each group. The individual workstations of each group are therefore not connected directly, but rather only via the particular group control system, to the section bus, to which, in turn, the particular section control system is connected. This concept also reaches its limits, in particular, in the case of modern textile machines comprising so-called autonomous workstations, in the case of which each individual workstation comprises a plurality of single drives and further units, which must be appropriately controlled, since each group control system must control and manage a plurality of units and, if necessary, supply the plurality of units with energy.

SUMMARY OF THE INVENTION

A problem addressed by the present invention is therefore that of providing a textile machine and a method for controlling a textile machine, which make reliable and rapid communication possible even in the case of large numbers of workstations and large numbers of communication-capable units. Additional objects and advantages of the invention will be set forth in part in the following description, or may be obvious from the description, or may be learned through practice of the invention.

The problems are solved with the aid of the features of the independent claims.

A textile machine, in particular a spinning machine or winder, comprises a plurality of adjacently arranged workstations, which are combined to form multiple sections, and each include multiple communication-capable units. The sections each comprise a section control system. The communication-capable units of the workstations of a section are connected to a section bus for the purpose of communication with the section control system.

It is now provided that the sections each comprise at least two section busses connected to the section control system, wherein a first portion of the communication-capable units of the workstations is connected to a first one of the at least two section busses and a second portion of the communication-capable units of the workstations is connected to a second one of the at least two section busses.

In a corresponding method for controlling such a textile machine, it is provided that the sections each comprise at least two section busses connected to the section control system, wherein a first portion of the communication-capable units of the workstations communicates via a first one of the at least two section busses with the section control system and/or further communication-capable units of the workstations, and wherein a section portion of the communication-capable units of the workstations communicates via a second one of the at least two section busses with the section control system and/or further communication-capable units of the workstations.

Within the scope of the present invention, "communication" and "communicate" are understood to be the exchange of information, which is utilized for controlling and/or monitoring the production of the textile machine. In particular, the communication therefore encompasses the transmission of control and/or sensor signals and/or operating parameters and/or external inputs.

If at least two busses are now provided at the section level in each case, the individual functional units of the individual workstations can be distributed onto the two section busses and can nevertheless be controlled via the common section control system. In this connection, it is advantageous, in particular, that the individual functional units of the workstations can communicate via the common section control system not only with the section control system but also with one another. Since the number of bus users on the section bus remains manageable in this case, rapid communication can nevertheless be achieved. In addition, as a result, fewer branches are necessary, which can otherwise result in signal reflections and problems with the bus terminator. Moreover, it is also possible, as a result, to accommodate the considerable wiring and the large number of plug connections necessary for utilizing the individual functional units in a spatially optimized manner in a comparatively small space. As a result, in turn, the necessary line lengths can be optimized, which, in turn, increases the speed of the information transmission.

Moreover, with respect to the method for controlling a textile machine, it is advantageous when the at least two section busses are operated using different transmission protocols and/or different communication speeds. As a result, it is possible, inter alia, to connect modern components, which can operate using a high-speed protocol, to a first bus and to nevertheless connect older components, which operate using a conventional protocol, to the second bus and continue utilizing the older components as usual. In addition, components, for example, which are not supposed to communicate with other components, can be connected separately to a separate bus in order to prevent an undesirable exchange of information.

Moreover, with respect to the textile machine, it is advantageous when the first portion of the communication-capable units, which is connected to the first section bus, comprises multiple identical units, in particular multiple identical single drives of the workstations, and/or multiple sensors, in particular yarn clearers. For example, in the case of a rotor spinning machine, the single rotor drives can be directly connected as bus users to the first section bus. Other communication-capable functional units, such as multiple identical yarn clearers of the workstations of the textile machine, can also be directly connected as bus users to the first section bus, however. If the textile machine is designed as an air-jet spinning machine, the air-jet spinning nozzle, for example, could also be directly connected as a bus user to the first section bus. The aforementioned functional units of the textile machine are units, in the case of which a rapid response is particularly important in order to shut down or start up the workstation or the textile machine, or to insert a thread. This rapid response can be ensured due to the connection of these units as direct bus users to the first section bus.

It is also advantageous when the second portion of the communication-capable units comprises workstation control systems, wherein multiple functional units of the workstations are connected to the workstation control systems in each case. In particular, functional units of the workstations are to be mentioned in this case, which can be controlled by a workstation control system in a coordinated manner, and so their direct connection to one of the section busses is not necessary. Since these functional units are not connected directly to the second section bus, but rather via the workstation control systems, the number of bus users on this bus can, in turn, be kept low in an advantageous way.

Moreover, it is advantageous when at least two dissimilar workstation control systems are provided. As a result, thematically and/or functionally related functional units of the workstations can be jointly controlled by a workstation control system or can receive information from the workstation control system or transmit information to the workstation control system. For example, in the case of a spinning machine, functional units, which are associated with the fiber material feed, can be connected to a first workstation control system, and further functional units, which are associated with the delivery of the finished thread, can be connected to a second workstation control system. In addition, as a result, the number of components on a circuit board and the number of necessary connecting elements can be reduced, whereby costs can be reduced. A higher level of flexibility with respect to the spatial arrangement of the individual components is nevertheless achieved in this case, and so more components can be accommodated in a comparatively small installation space in a space-optimized manner. Interferences and malfunctions during the signal transmission can also be reduced as a result.

It is also advantageous when the dissimilar workstation control systems contain first workstation control systems, which each comprise a power unit for supplying power to the functional units of the workstations, and contain second workstation control systems, which each comprise a memory for a sequence control system. Separate power units on the individual functional units are therefore not necessary.

Accordingly, with respect to the method for controlling the textile machine, it is also advantageous when the communication-capable units of the workstations comprise at least two dissimilar workstation control systems, wherein first workstation control systems supply functional units of the workstations with energy, and wherein second workstation control systems control time sequences at the workstations.

With respect to the method, it is also advantageous when the first workstation control systems and the second workstation control systems communicate with one another directly via one of the at least two section busses. Due to the second workstation control systems, which contain the sequence control system, a rapid response of the individual functional units can be ensured with the aid of the second section bus and the first workstation control systems, since the first workstation control systems and the second workstation control systems can communicate with one another directly via the second section bus.

Moreover, in order to enable communication between the bus users connected to different busses, it is also advantageous with respect to the method when the section control system functions as a bridge between the first portion of the communication-capable units of the workstations and the second portion of the communication-capable units of the workstations.

According to a refinement of the invention, it is also advantageous when the first workstation control systems are designed as group control systems for a group of multiple, in particular four, workstations. The number of bus users on the second section bus can be reduced as a result, which, in turn, ensures faster information transmission. Moreover, the wiring complexity can be reduced as a result and the length and number of the lines, which also generate costs, can be minimized. As a result, it is also possible to reduce the number of necessary plug connections, so that the plug connections can be accommodated in a comparatively small space. Moreover, as a result, only one power supply unit for the power supply and, if present, only one processor for multiple workstations are necessary, in an advantageous way. In addition, as a result, the costs of the communication structure can be reduced overall.

In addition, it is also advantageous when at least a portion of the functional units of the workstations comprises at least one single drive in each case. In this case, as described above with reference to the example of the single rotor drive, the functional units or their single drives can be directly connected as bus users to one of the section busses or can be indirectly connected to one of the section busses via a workstation control system. In any case, rapid and reliable communication is ensured with the aid of the described communication structure comprising two section busses, also in the case of a machine including a plurality of single drives of the type required for autonomous workstations.

It is advantageous in this case when each of the workstations comprises, as functional units, at least a feed drive, a delivery drive, a winding drive, and a traversing drive. If the textile machine is designed as a rotor spinning machine, the feed drive is the drive of a feed roller. If the textile machine is designed as a winder, however, the feed drive would be the drive of a delivery bobbin and, in the case of another spinning machine, such as a ring spinning machine or an air-jet spinning machine, the feed drive would be, for example, a drafting system.

Of course, however, even further functional units can be provided on the workstations in the case of spinning machines as well as in the case of winders. Examples worth noting here are a yarn clearer comprising a drive of the yarn clearer, provided the yarn clearer includes a movable measuring head, a waxing unit encompassing a waxing drive or, in the case of a rotor spinning machine, an opening unit including an opening drive. Moreover, an opener unit for the spinning unit comprising an opener drive can be provided at a spinning station. The aforementioned rotor comprising the single rotor drive also forms a functional unit of the workstation, of course, even when the functional unit is connected to another section bus.

In this connection, it is advantageous when at least the feed drive of each workstation is connected to one of the first workstation control systems in each case.

It is also advantageous when at least the delivery drive, the winding drive, and the traversing drive of each workstation are connected to one of the second workstation control systems.

According to another refinement, it is advantageous when a display device is associated with the workstations. Preferably, a display device is associated at least with the second workstation control systems in this case. With the aid of the display device, information regarding the individual workstations can be displayed for the operator. In this connection, it is advantageous when a common display device is associated with two workstations, in particular two second workstation control systems, in each case. The costs and wiring complexity can be further reduced as a result.

According to a further advantageous refinement, at least one power supply unit is provided for each section and is connected as a bus user to the first section bus and/or to the second section bus. As a result, the power supply unit can be approached, for example, via the machine control system or via the section control system and can be switched to a no-load state. It is therefore also possible to read out data, via the section bus, regarding the energy consumption or performance data of the power supply unit, such as a power output per kilogram of yarn. As a result, for example, states of wear of assemblies can be identified and production can be optimized.

Moreover, with respect to the textile machine, it is advantageous when the textile machine comprises a machine control system and a machine bus, and the section control systems are connected to the machine bus for communication with the machine control system. With the aid of the machine control system, which generally also includes an input device for an operator, information and data regarding the individual products can be forwarded to the section control systems. The section control systems can be utilized, in this case, only for forwarding the data coming from the machine control system to the individual bus users, and vice versa. The processing of the data into control data can take place, in this case, with the aid of the first workstation control systems and/or the second workstation control systems. It is also possible, however, that the section control systems process data arriving at the section control systems and, on the basis of the data, generate control data for the individual bus users.

BRIEF DESCRIPTION OF THE DRAWINGS

Further advantages of the invention are described with reference to the exemplary embodiments represented in the following. Wherein.

DETAILED DESCRIPTION

Figure 1:
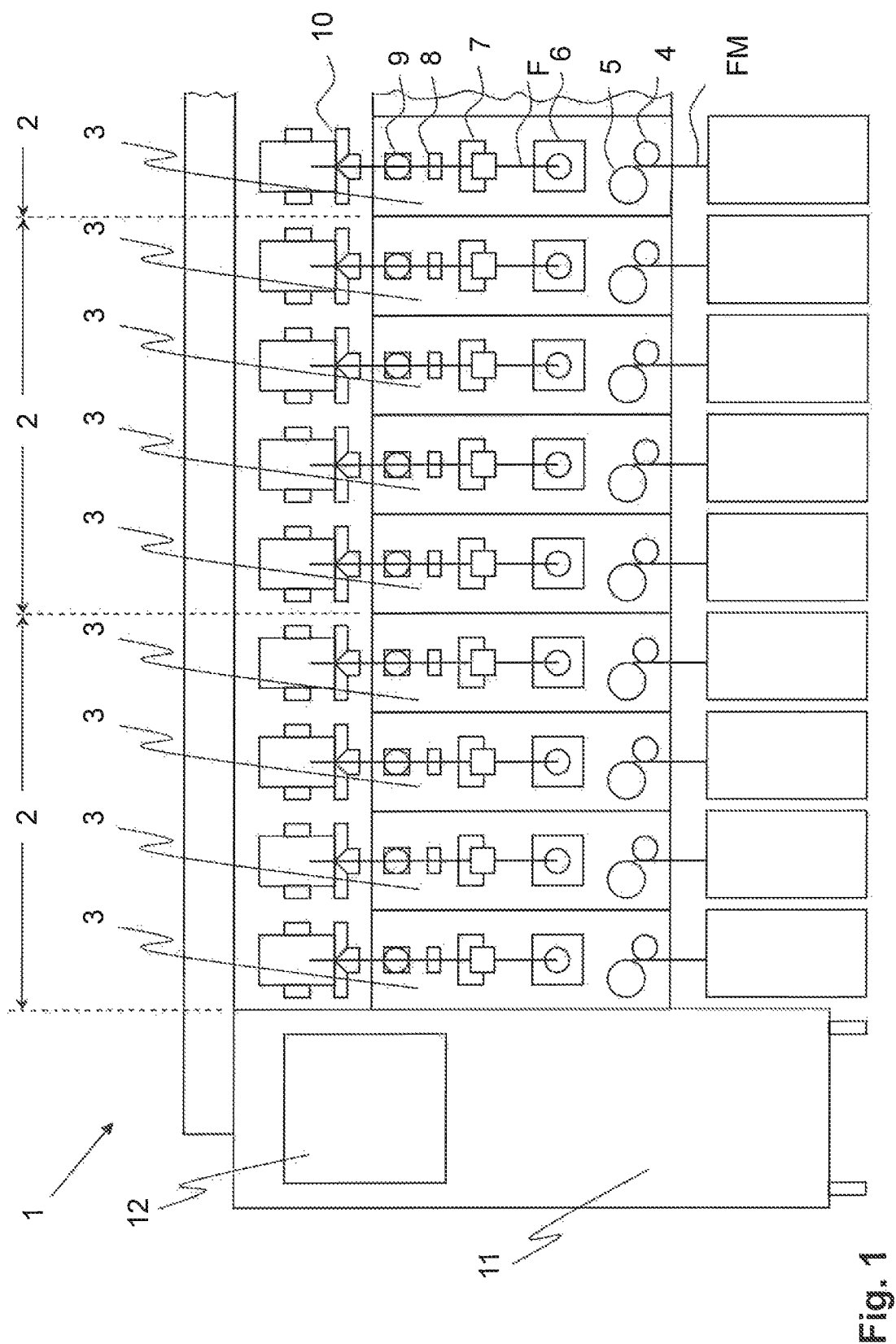
FIG. 1 shows a schematic front view of a textile machine, as an overview representation.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a schematic front view of a textile machine 1 comprising a plurality of adjacently arranged, identical workstations 3. Multiple workstations 3 are combined to form one section 2 in each case, in order to simplify the configuration and the control of the textile machine 1. Only one longitudinal side of the textile machine 1 is visible in this case. Generally, however, textile machines 1 have two longitudinal sides positioned opposite one another, each of which contains the same number of workstations 3. In the present case, a section 2 is therefore made up of eight workstations 3, namely the four workstations 3 visible in this case, and the four workstations 3 on the other longitudinal side of the textile machine 1, which are not visible in this case. In reality, a section 2 comprises considerably more workstations 3, of course; usually there are, for example, 20 workstations 3 per section 2. Moreover, only two sections 2 are represented in entirety, while a third section 2 is represented as having been broken off. At one end, the textile machine 1 comprises a foot end 11, in which, in the present example, a machine control system 12 is arranged. The machine control system 12 preferably includes an input device and is higher-level than the entire communication structure of the textile machine 1, as is described in the following. If necessary, the machine control system 12 can also be connected to a further higher-level production facility control system 23 (see FIG. 3). A further foot end 11 can also be provided at another end (not visible here) of the textile machine 1.

The individual functional units of the workstation 3 are now indicated, by way of example, on a workstation 3 of the third, incompletely represented section 2. This is described using the example of a rotor spinning machine in this case. Reference is made to the preceding description with respect to the design of the individual functional units of the workstations 3 in the case of an air-jet spinning machine, a ring spinning machine, or a winder. The individual workstations 3 each comprise a feed device 4, with the aid of which a fiber material FM can be fed to the workstation 3. With the aid of an opening unit 5, in which the fiber material FM is opened into individual fibers, the fiber material FM subsequently enters the spinning machine 6, where it is spun into a thread F. The thread F is drawn off with the aid of a draw-off device 7 and, in the present example, is guided over a yarn clearer 8 and a waxing unit 9. From there, the thread F is finally fed to the winding device 10, where it is wound onto a cross-wound package.

Figure 2:
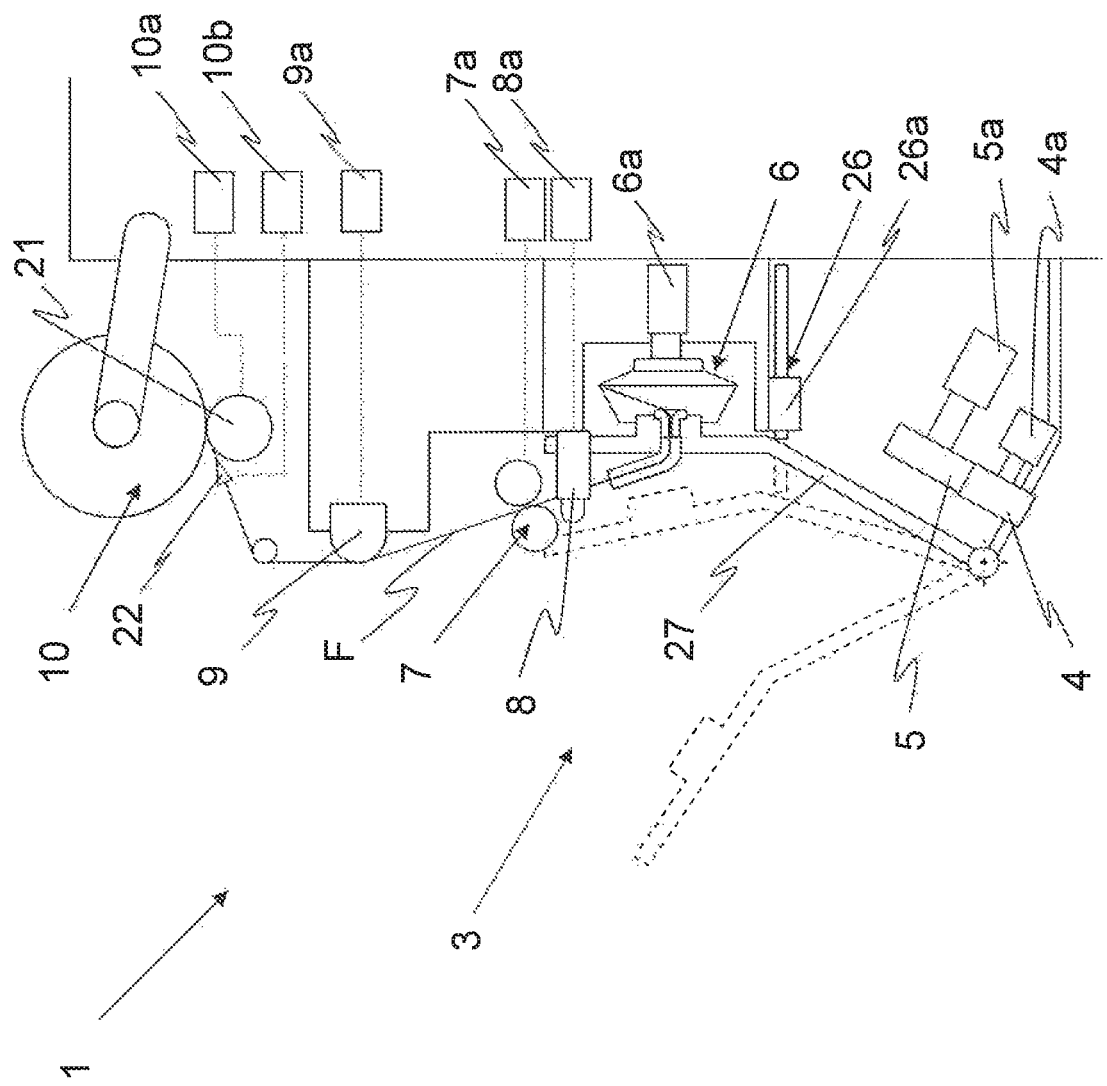
FIG. 2 shows a schematic, cut side view of a workstation of a textile machine.

FIG. 2 shows a schematic and partially cut side view of a workstation 3 of the textile machine 1 from FIG. 1. The individual, above-described functional units of the workstation 3 are apparent once again, in greater detail. The workstation 3 comprises the feed device 4, as described, which includes a workstation-specific feed drive 4a in this case. The opening unit 5 is also provided with a single drive, namely the opening drive 5a. Moreover, the spinning machine 6, which contains an individually driven spinning rotor in this case, is now apparent with the added detail of the drive 6a of the spinning machine 6. Due to the rotation of the spinning rotor, the fiber material FM made available by the opening unit 5 is incorporated into the end of the thread F extending into the spinning rotor, in a way known per se. The thread F emerges from the spinning machine 6 on the outer side of the spinning machine 6, which is closed by a cover element 27, and is drawn off by the draw-off device 7. For this purpose, the draw-off device 7 comprises a spinning station-specific single drive, namely the delivery drive 7a.

During the draw-off, the thread F is guided over a yarn clearer 8, as described above, which inspects the thread or the yarn for yarn defects such as thick places and thin places. The yarn clearer 8 can also be utilized as a thread monitor, which detects the presence of the thread F at the workstation 3 and immediately stops the workstation 3 in the case of a thread breakage. If the yarn clearer 8 detects a yarn defect, however, the workstation 3 is also stopped and the faulty thread piece is subsequently removed. Thereafter, the thread F must be re-pieced in order to reconnect the fibers in the spinning rotor to the thread end. The yarn clearer 8 is provided with a single drive in this case, the drive 8a of the yarn clearer 8, with the aid of which the thread F can be guided back and forth in a traversing manner in a direction transversely to its draw-off direction. The wearing of a groove into the delivery rollers of the draw-off device 7 can be avoided as a result. Alternatively, it would also be conceivable, of course, to provide a separate traversing drive for the thread F, outside of the yarn clearer 8, in the region of the draw-off device 7.

In the further course, the drawn-off thread F passes over a waxing unit 9, where it is drawn over a rotating wax block. The wax block is drivable with the aid of a single drive, namely the waxing drive 9a. Finally, the thread F reaches the winding device 10, where it is wound onto a bobbin in a way known per se. The winding device 10 contains a winding roller 21 which is driven, in this case, with the aid of a single drive, namely the winding drive 10a, and a thread guide 22 driven with the aid of a single drive, namely the traversing drive 10b.

The described workstation 3 is preferably designed, in this case, as a so-called autonomous workstation 3, i.e., it can carry out all processes relevant to the spinning process, such as piecing, the shutdown and start-up of the individual workstation, automatically, i.e., without a displaceable maintenance device. The individual functional units of the workstations 3 each include single drives for this purpose. In order to make it possible to carry out automatic piecing or, if necessary, maintenance work at the workstation 3, the workstation 3 shown in this case also includes an opener unit 26, with the aid of which the cover element 27, which closes the spinning machine 6 during the spinning operation, can be opened. Various open states of the cover element 27 are represented in this case with the aid of dashed lines.

Figure 3:
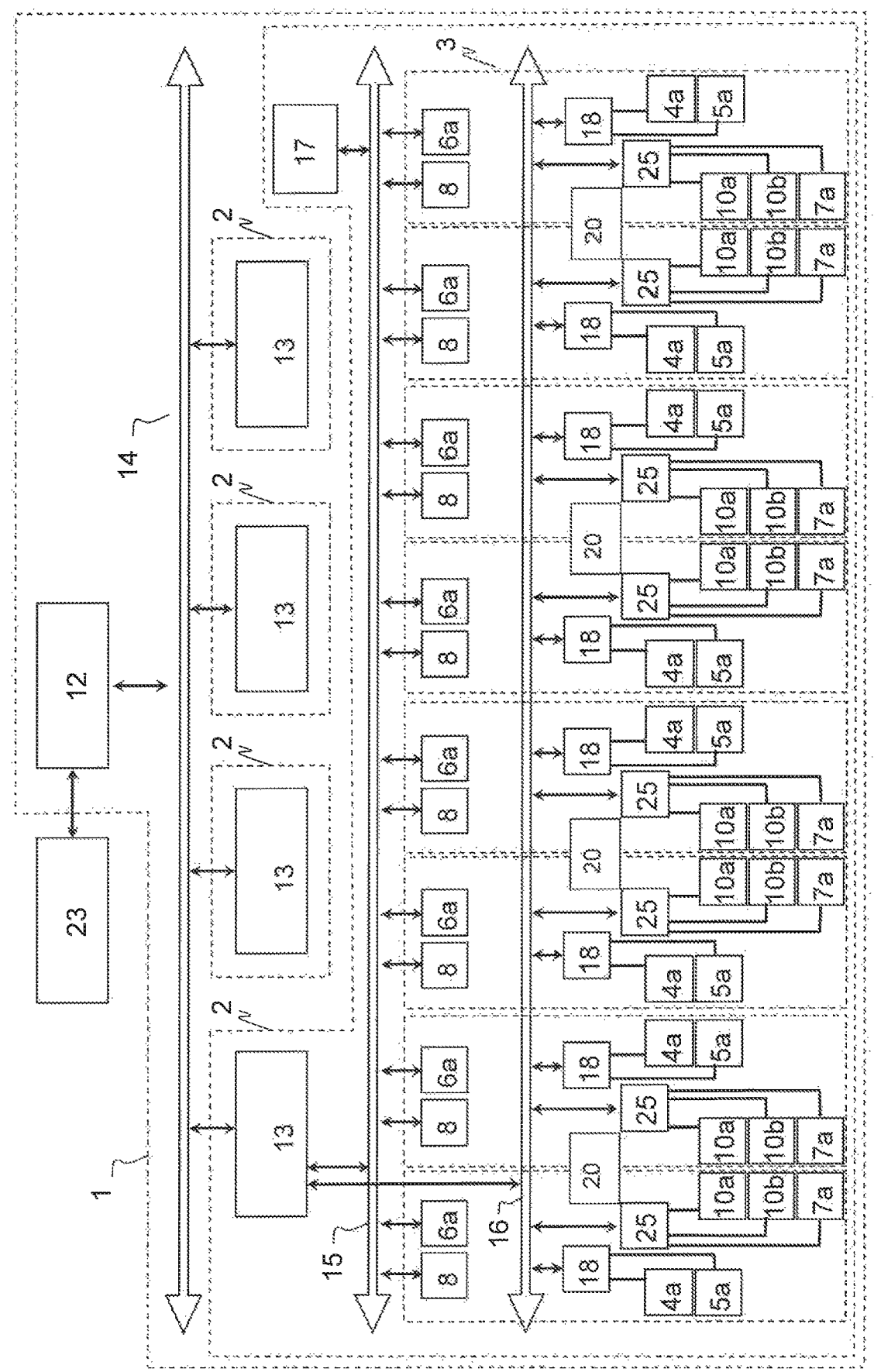
FIG. 3 shows a block diagram of a communication and control structure of a textile machine.

FIG. 3 shows a block diagram of a control and communication structure of a textile machine 1, which is designed as a rotor spinning machine in this case as well. The textile machine 1 comprises a plurality of identical, adjacently arranged sections 2, each of which, in turn, includes its own section control system 13. Each of the sections 2 comprises a plurality of adjacently arranged workstations 3, wherein, in this case, only the workstations 3 for one section 2 are represented, for the sake of clarity. In addition, only one of the workstations 3 is labeled, for the sake of clarity. The section control systems 13 are connected to a machine control system 12 via a machine bus 14 in a manner known per se. Via the machine control system 12, the individual sections 2 or their workstations 3 receive data, for example, information regarding the products to produce. In addition, the sections 2 or the section control systems 13 can communicate with the machine control system 12 via the machine bus 14 and transmit data and information regarding the individual sections 2 and/or regarding individual workstations 3 to the machine control system 12.

For the purpose of communication within the individual sections 2, at least two section busses 15, 16 are now provided in each section 2, wherein the section control system 13 is connected to both section busses 15, 16. The connections are usually designed as insulation displacement connectors, which are symbolized by double arrows in the present case. The section busses 15, 16 and the machine bus 14 can be designed as a CAN bus or as an Ethernet bus in this case.

Each of the workstations 3 now comprises a plurality of communication-capable units, which can encompass functional units of the workstation 3 as well as control units of the workstation 3. In the present example, the workstations 3 comprise, as functional units, a feed device 4 (see FIG. 2) encompassing a feed drive 4a, an opening unit 5 (see FIG. 2) encompassing an opening drive 5a, a winding device 10 (see FIG. 2) encompassing a winding drive 10a and a traversing drive 10b, a draw-off device 7 (see FIG. 2) encompassing a delivery drive 7a, a spinning machine 6 (see FIG. 2) encompassing a drive 6a as well as a yarn clearer 8, which contains a sensor (not represented) and can additionally contain a drive 8a (see FIG. 2). Moreover, each workstation 3 comprises at least one workstation control system 18, 25. The textile machine 1 shown in the present case comprises two different workstation control systems 18, 25, wherein the two workstation control systems 18, 25 are provided at each of the workstations 3. Even further functional units can be provided in the case of the textile machine 1 shown in FIG. 3, of course, as is represented in FIG. 2, for example.

It is now provided that a first portion of the described communication-capable units is connected to the first section bus 15 of the two section busses 15, 16 and a second portion of the communication-capable units of the workstations 3 is connected to the second section bus 16. Due to the provision of two section busses 15, 16, it is possible to not only better distribute the individual bus users at the section level in the communication structure. It is also possible to operate the two section busses 15, 16 at different communication speeds and to enable a rapid data exchange between communication-capable units connected to a particular common section bus 15, 16. On the other hand, it is also possible to prevent communication between communication-capable units by connecting these to different section busses 15, 16. Provided a data exchange between the two section busses 15, 16 intermittently or constantly or only between certain users or communication-capable units is nevertheless desirable, this can take place despite the connection to different section busses 15, 16 with the aid of the section control system 13. The present communication structure comprising two section busses 15, 16 therefore offers various arrangement possibilities for the communication-capable units, wherein a rapid response is nevertheless always ensured due to the reduced number of bus users on each section bus 15, 16.

In this case, the yarn clearer 8, also together with its drive 8*a* (see FIG. 2) and the drive 6*a* of the spinning machine 6, if necessary, is directly connected as a bus user to the first section bus 15. The further functional units of the workstations 3, however, are not directly connected, but rather only indirectly connected to the second section bus 16 via two workstation control systems 18, 25 in this case. In the present example, the feed drive 4*a* and the opening drive 5*a* are each connected to the first workstation control system 18, and the winding drive 10*a*, the traversing drive 10*b*, and the delivery drive 7*a* are each connected to the second workstation control system 25. It is therefore also not absolutely necessary for the functional units of the workstations 3 indirectly connected to one of the section busses 15, 16 to be designed as communication-capable functional units, although this is possible, of course. In any case, due to the indirect connection of multiple functional units of the workstations 3 via the workstation control systems 18, 25, the number of bus users on the second section bus 16 is reduced in an advantageous way, which, in turn, ensures a rapid response. Moreover, even more display devices 20 for the workstations 3 are apparent in the present representation, wherein a common display device 20 is associated with two workstations 3 in each case. With the aid of the display devices 20, an operator can call up information regarding the operating condition and/or the products produced at the particular workstations 3.

In deviation from the representation shown, it would also be possible, of course, to provide only one workstation control system 18, 25. Moreover, as described above, more or fewer or other communication-capable units or functional units can be provided at the workstations 3. In this connection, it would also be conceivable, of course, in particular when the workstations 3 comprise only a few functional units, to design all functional units of the workstations 3 as communication-capable functional units and to directly connect the functional units to one of the two section busses 15, 16, wherein the functional units are then controlled in a manner known per se with the aid of the section control system 13. The indirect connection of the functional units with the aid of one or multiple workstation control systems 18, 25 is advantageous, however, in particular when the workstations 3 comprise a plurality of functional units.

If, as shown in this case, two workstation control systems 18, 25 are provided in each case, the individual functional units can be connected to these two workstation control systems 18, 25 according to different criteria. For example, it is conceivable that the first workstation control system 18 is utilized for the power supply and comprises a power unit (not represented), while the second workstation control system 25 is designed as a spinning machine control system and contains a sequence control system. In order to also ensure the power supply of the functional units are connected to the second workstation control system 25, the second workstation control system 25 can be directly connected to the first workstation control system 18 via supply lines (not represented here).

A power supply unit 17 is utilized for supplying power to the first workstation control systems 18. In this case, a power supply unit 17 is provided in each of the sections 2 and is connected to each of the first workstation control systems 18 via supply lines (not represented here, either). In the present exemplary embodiment, the power supply unit 17 is directly connected, as the bus user in each case, to the first section bus 15. As a result, the power supply unit 17 can be approached directly via the section control system 13 and/or via the machine control system 12 and can be switched to a no-load state or can be switched on again. As a result, the energy consumption can be reduced during downtime of the section 2 or of the textile machine 1. In addition, safety aspects are also taken into account as a result. The power supply unit 17 could also be connected to the second section bus 16, of course, rather than to the first section bus 15 as in this case.

Figure 4:
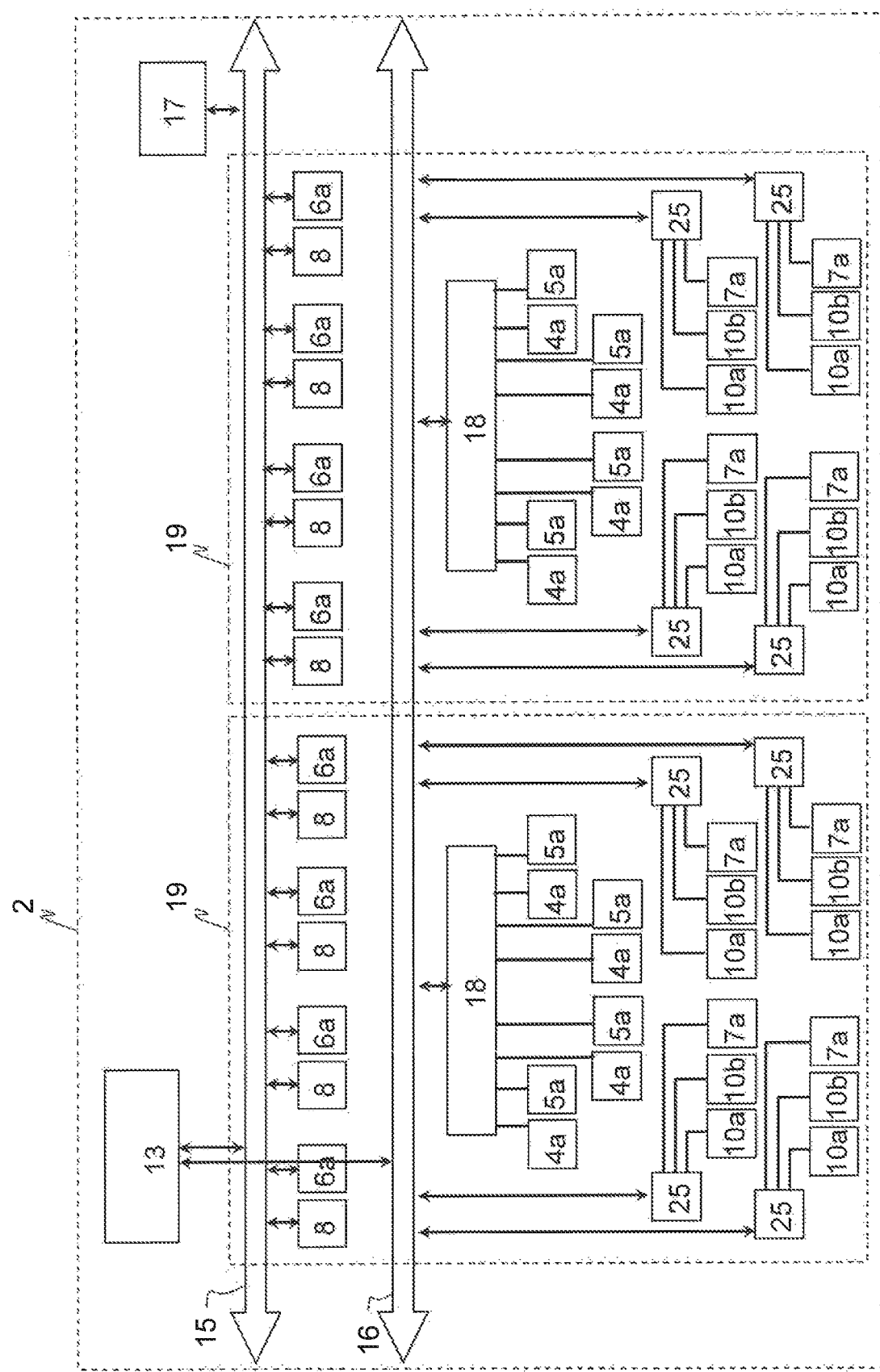
FIG. 4 shows a schematic representation of a section comprising a communication and control structure.

FIG. 4 shows an alternative embodiment of a communication and control structure for a textile machine 1. Only the differences with respect to the exemplary embodiment from FIG. 3 are described in the following, in order to avoid unnecessary repetitions. The same reference numbers are utilized, in this case, for features that are identical or at least comparable to the exemplary embodiment represented in FIG. 3 with respect to their design and/or mode of operation. Provided the features are not described in detail again, their design and/or mode of operation correspond/corresponds to the design and mode of operation of the above-described features. Moreover, for the sake of greater clarity, only one single section 2 is shown in FIG. 4, in which only the communication structure at the section level and at the workstation level is shown.

In contrast to the embodiment from FIG. 3, the first workstation control systems 18 are not provided at each of the workstations 3 (not labeled here), but rather the first workstation control systems 18 are designed as group control systems. Multiple workstations 3 are combined once again to form groups 19 within the sections 2 in each case and are each associated with a common first workstation control system 18. In this case, a group 19 encompasses four workstations 3. More or fewer workstations 3 per group 19 is also conceivable, of course. The first workstation control systems 18, in turn, are provided for the power supply of the individual workstations 3, wherein, advantageously, only one power unit (not represented) is necessary for the entire group 19 made up of multiple workstations 3. The second workstation control systems 25, however, are provided as single control systems for each workstation 3, as is also shown in FIG. 3, in order to be able to configure the sequences at the individual workstations 3 independently of the other workstations 3 in each case. Such a communication and control structure can be designed to be particularly space-saving and requires a substantially simpler wiring complexity having shorter line lengths, which, in turn, benefits the transmission speed.

The present invention is not limited to the represented and described exemplary embodiments. Modifications within the scope of the claims are also possible, as is any combination of the features, even if they are represented and described in different exemplary embodiments.

LIST OF REFERENCE NUMBERS

1 textile machine
2 section
3 workstation
4 feed device
   4*a* feed drive
5 opening unit
   5*a* opening drive
6 spinning machine
   6*a* drive of the spinning machine 7 draw-off device
   7a delivery drive
8 yarn clearer
   8a drive of the yarn clearer
9 waxing unit
   9a waxing drive
10 winding device
   10a winding drive
   10b traversing drive
11 foot end
12 machine control system
13 section control system
14 machine bus
15 first section bus
16 second section bus
17 power supply unit
18 first workstation control system
19 group
20 display device
21 winding roller
22 thread guide
23 production facility control system
25 second workstation control system
26 opener unit
   26a opener drive
27 cover element
FM fiber material
F thread

The invention claimed is:

1. A textile machine, comprising:
a plurality of adjacently arranged workstations divided into a plurality of sections, each workstation comprising a plurality of communication-capable units;
each section comprising at least two section busses;
each section comprising a section control system, wherein the communication-capable units of the workstations in the section are in communication with the section control system via one of the section busses;
a first portion of the communication-capable units of the workstations in each section configured in communication with a first one of the section busses and a second portion of the communication-capable units of the workstations in the same section configured in communication with a second one of the section busses; and
wherein the second portion of the communication-capable units comprises a plurality of workstation control systems, and wherein multiple functional units of the workstations are connected to the workstation control systems.

2. The textile machine as in claim 1, wherein the first portion of the communication-capable units comprises multiple identical functional units of the workstations.

3. The textile machine as in claim 1, wherein at least two of the workstation control systems are dissimilar workstation control systems.

4. The textile machine as in claim 3, wherein the dissimilar workstation control systems comprise a first workstation control system with a power unit for supplying power to the functional units of the workstations, and a second workstation control system with a memory for a sequence control system.

5. The textile machine as in claim 4, wherein the first workstation control system is configured as a group control system for a plurality of the workstations in the section.

6. The textile machine as in claim 4, wherein at least a portion of the functional units comprise a single drive for each functional unit.

7. The textile machine as in claim 6, wherein the functional units with the single drive comprise a feed device with a feed drive, a draw-off device with a delivery drive, a winding device with a winding drive, and a traversing drive.

8. The textile machine as in claim 7, wherein the feed drive is connected to the first workstation control system.

9. The textile machine as in claim 7, wherein the delivery drive, the winding drive, and the traversing drive of each workstation are connected to the second workstation control system.

10. The textile machine as in claim 4, comprising a display device configured at each workstation in communication with the second workstation control system.

11. The textile machine as in claim 1, wherein each section comprises a power supply unit connected to one or both of the first section bus and the second section bus.

12. The textile machine as in claim 1, further comprising a machine control system and a machine bus, the section control systems in communication with the machine control system via the machine bus.

* * * * *

UNITED STATES PATENT AND TRADEMARK OFFICE
CERTIFICATE OF CORRECTION

PATENT NO. : 11,236,445 B2
APPLICATION NO. : 16/556408
DATED : February 1, 2022
INVENTOR(S) : Mario Maleck and Robin Wein It is certified that error appears in the above-identified patent and that said Letters Patent is hereby corrected as shown below:

On the Title Page

Item (73), Correct the spelling of the Assignee as follows:
Maschinenfabrik Rieter AG Signed and Sealed this
Twentieth Day of December, 2022

Katherine Kelly Vidal
*Director of the United States Patent and Trademark Office*